US 008819060B2

(12) United States Patent
Tamm et al.

(10) Patent No.: US 8,819,060 B2
(45) Date of Patent: Aug. 26, 2014

(54) VIRTUAL OBJECTS IN AN ON-DEMAND DATABASE ENVIRONMENT

(75) Inventors: Steven Tamm, San Francisco, CA (US); Susan Kimberlin, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 212 days.

(21) Appl. No.: 13/088,047

(22) Filed: Apr. 15, 2011

(65) Prior Publication Data

US 2012/0130973 A1 May 24, 2012

Related U.S. Application Data

(60) Provisional application No. 61/415,739, filed on Nov. 19, 2010.

(51) Int. Cl.
*G06F 17/30* (2006.01)

(52) U.S. Cl.
USPC .......................................................... 707/770

(58) Field of Classification Search
CPC ..................... G06F 17/30545; G06F 17/30566
USPC .......................................................... 707/770
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |

(Continued)

OTHER PUBLICATIONS

"OASIS Content Management Interoperability Services (CMIS) Version 1.0," downloaded from http://docs.oasis-open.org/cmis/CMIS/v1.0/os/cmis-spec-v1.0.html, dated May 1, 2010, 216 pages.

(Continued)

*Primary Examiner* — Jorge A Casanova
(74) *Attorney, Agent, or Firm* — Blakely, Sokoloff, Taylor & Zafman

(57) ABSTRACT

In accordance with embodiments disclosed herein, there are provided mechanisms and methods for implementing virtual objects in an on-demand database environment. For example, in one embodiment, mechanisms include receiving a data request at a host organization, wherein the data request specifies a first data source internal to the host organization and further specifies a second data source external to the host organization; retrieving first data results from the first data source based on the data request; retrieving second data results from the second data source based on the data request; and returning aggregated data results responsive to the data request based on the first data results and the second data results retrieved. In one embodiment, the internal data source is a multi-tenant database within the host organization.

22 Claims, 6 Drawing Sheets

(56) References Cited

U.S. PATENT DOCUMENTS

| | | | |
|---|---|---|---|
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| 6,343,286 B1 * | 1/2002 | Lee et al. | 1/1 |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,406,461 B1 * | 7/2008 | Chapman et al. | 1/1 |
| 7,620,655 B2 | 11/2009 | Larsson et al. | |
| 7,792,878 B2 * | 9/2010 | Dettinger et al. | 707/810 |
| 7,877,381 B2 * | 1/2011 | Ewen et al. | 707/719 |
| 7,984,040 B2 * | 7/2011 | Mishra et al. | 707/713 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0131893 A1 * | 6/2005 | Von Glan | 707/5 |
| 2009/0063448 A1 * | 3/2009 | DePue et al. | 707/5 |
| 2009/0144251 A1 * | 6/2009 | Dettinger et al. | 707/3 |
| 2009/0198649 A1 * | 8/2009 | Vaughan et al. | 707/3 |
| 2009/0319499 A1 * | 12/2009 | Meijer et al. | 707/4 |
| 2010/0169351 A1 * | 7/2010 | Kulkarni et al. | 707/759 |
| 2010/0241637 A1 * | 9/2010 | Kissner et al. | 707/752 |
| 2010/0281053 A1 * | 11/2010 | Braines et al. | 707/770 |
| 2012/0215763 A1 * | 8/2012 | Hughes et al. | 707/718 |

OTHER PUBLICATIONS

"Virtual Tables," downloaded from http://publib.boulder.ibm.com/infocenter/db2luw/v9/index.jsp?topic=/com.ibm.help.etl.doc/designing/data_flow/copvirtables.html, on Apr. 12, 2011, 2 pages.

"Google Search Appliance—Search Protocol Reference," downloaded from http://code.google.com/apis/searchappliance/documentation/62/xml_reference.html, on Apr. 12, 2011, 85 pages.

"Open Data Protocol," downloaded from http://www.odata.org/developers/protocols/overview, on Apr. 12, 2011, 9 pages.

"Open Search 1.1, Draft 4," http://www.opensearch.org/Specifications/OpenSearch/1.1, on Apr. 12, 2011, 25 pages.

"Integration Platform Technologies: Siebel eBusiness Application Integration vol. II," dated Sep. 2004, 210 pages.

"Web Distributed Authoring and Versioning (WebDAV) Search," downloaded from http://tools.ietf.org/html/rfc5323, dated Nov. 2008, 50 pages.

* cited by examiner

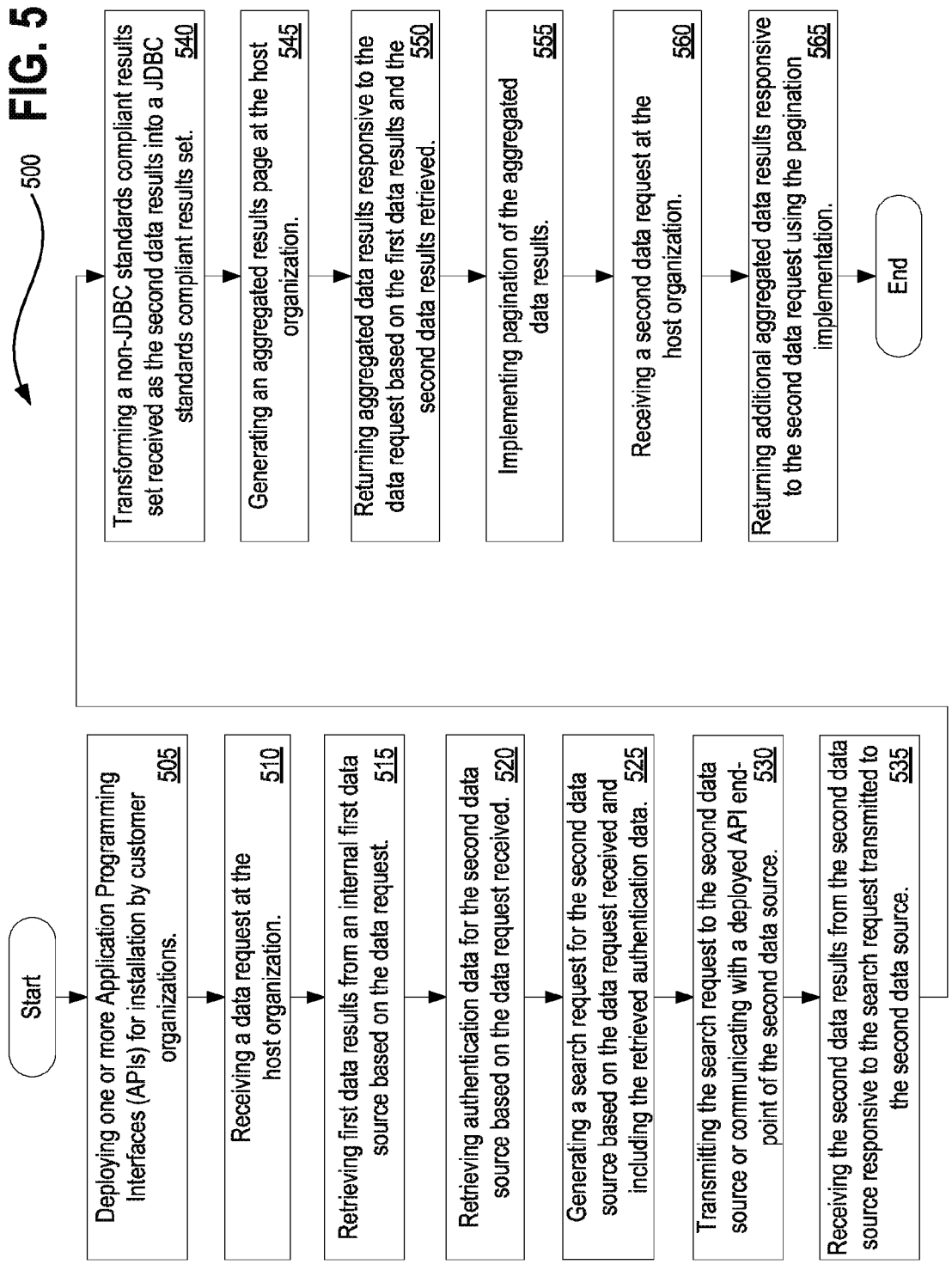

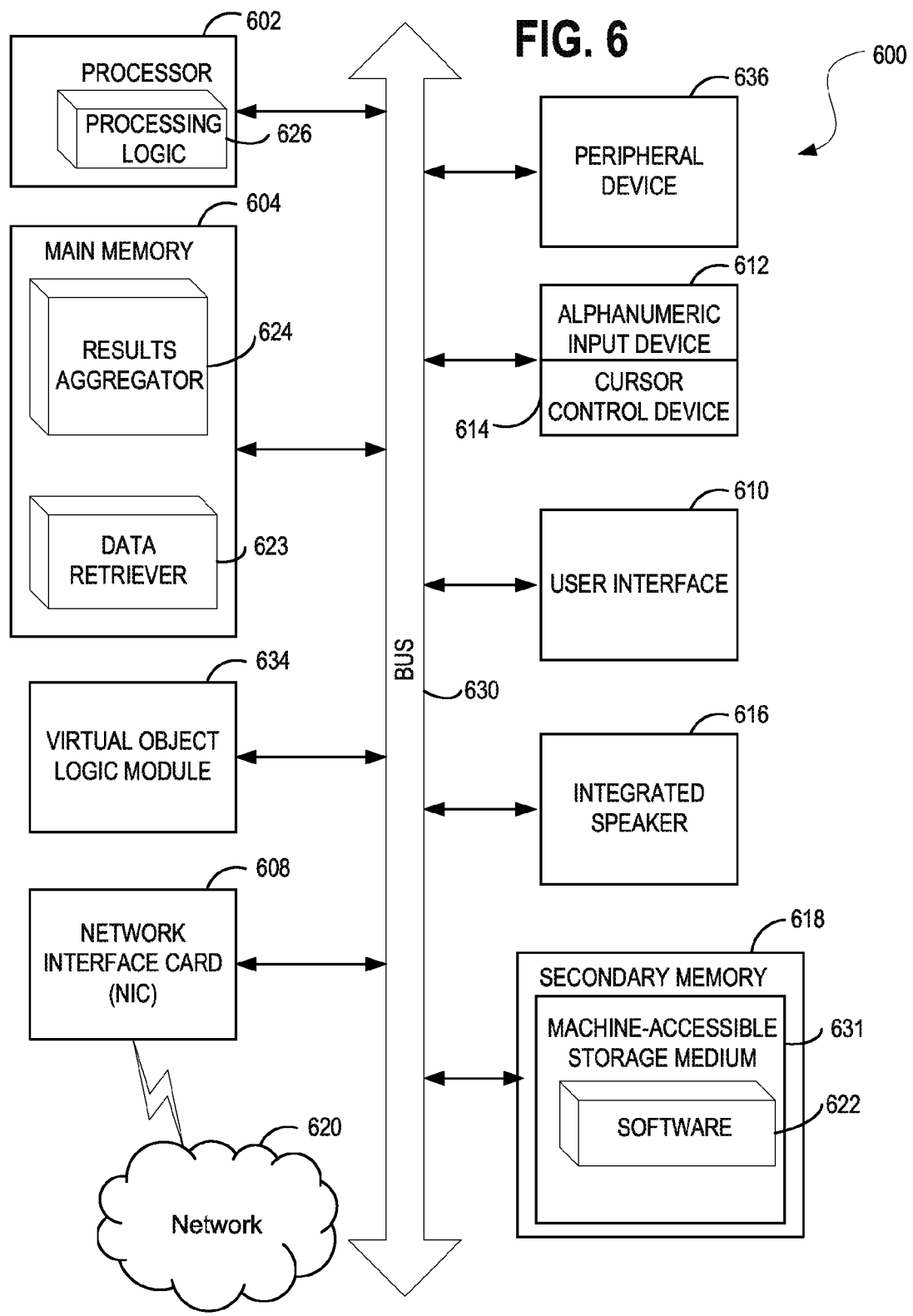

VIRTUAL OBJECTS IN AN ON-DEMAND DATABASE ENVIRONMENT

CLAIM OF PRIORITY

This application is related to, and claims priority to, the provisional utility application entitled "VIRTUAL OBJECTS IN AN ON-DEMAND DATABASE ENVIRONMENT," filed on Nov. 19, 2010, having an application number of 61/415,739, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments relate generally to the field of computing, and more particularly, to methods and systems for implementing virtual objects in an on-demand database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

In a conventional computing environment in which search queries and database queries are supported, a computing device submits a database request to a local database, and receives a results set responsive to the query, or submits a search request (e.g., against a search index or to a search engine), and receives search results responsive to the search request.

Where such queries and searches are supported, the information returned is specific to one data source. For example, returned data may include a results set from a database which is accessible to a particular organization, or search results may include information from, for example, a particular search engine, a social networking site, or a search index accessible to a particular entity or organization. Such results are limited in scope as they are specific to one source.

Where additional query or search scope is required, for example, data is required from multiple sources, conventional mechanisms and techniques necessitate the development of multiple searches and/or multiple queries, so as to adequately cover the desired scope of data sources.

Such a problem is exacerbated where a client device is attempting to request information which may reside within the "cloud," for example, data may be stored remotely by an on-demand database or services provider, and where the client device is further attempting to request information which does not reside within the same on-demand database or services provider. Because the desired data is not located in a central location, conventional mechanisms and techniques require multiple searches and/or queries to be performed.

The present state of the art may therefore benefit from the methods and systems for implementing virtual objects in an on-demand database environment as described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 5 is a flow diagram illustrating a method for implementing virtual objects in an on-demand database environment in accordance with disclosed embodiments; and FIG. 6 illustrates a diagrammatic representation of a machine in the exemplary form of a computer system, in accordance with one embodiment.

DETAILED DESCRIPTION

Figure 1:
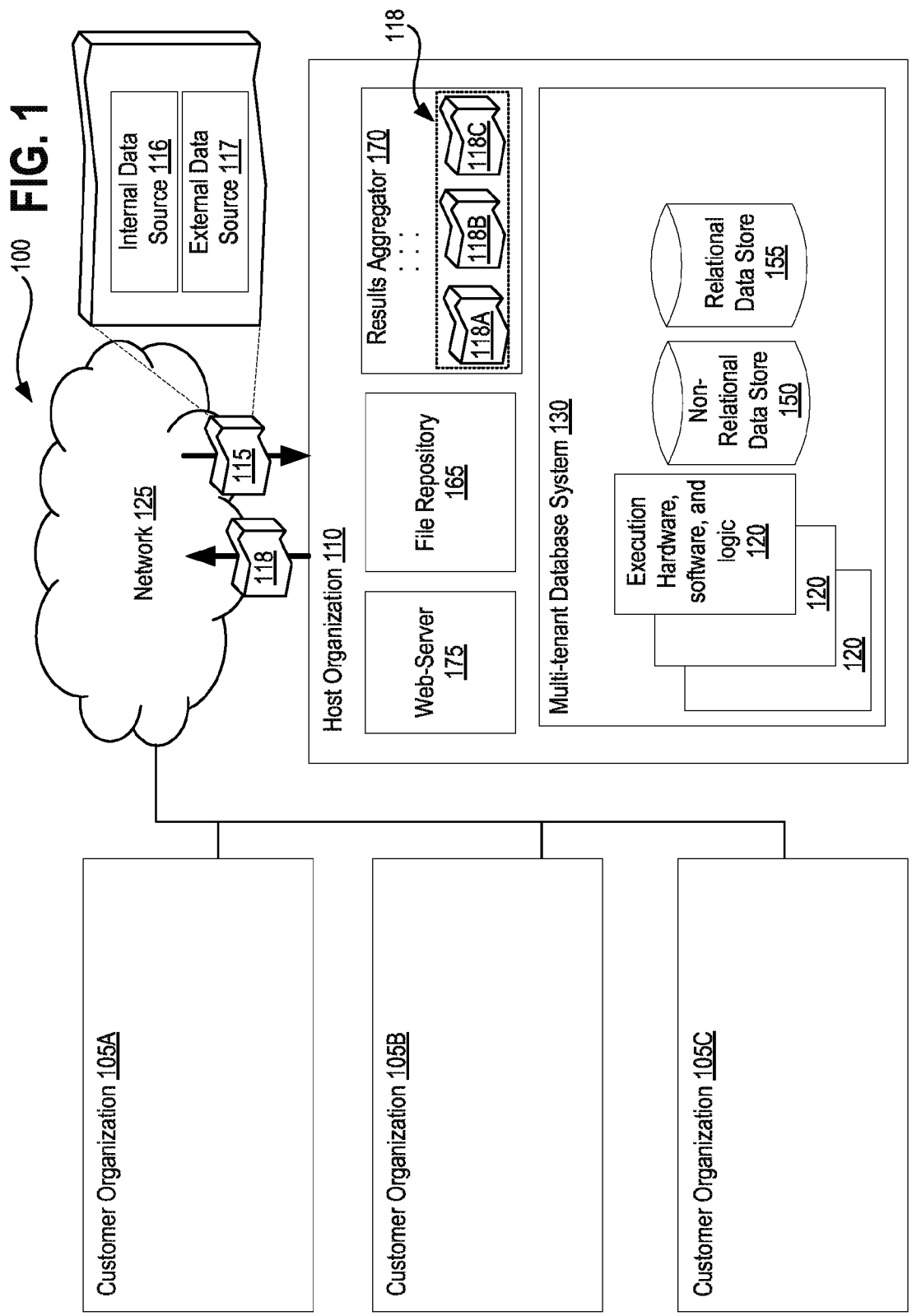
FIG. 1 depicts an exemplary architectural overview of the environment in which embodiments may operate.

Described herein are systems, devices, and methods for implementing virtual objects in an on-demand database environment, for example, described are mechanisms for associating virtual objects with internal data sources and also with external data sources, so as to make underlying data sources associated with or corresponding to such virtual objects interfaceable, searchable, queryable, and so forth.

In a particular embodiment, such mechanisms include receiving a data request at a host organization, in which the data request specifies a first data source internal to the host organization and further specifies a second data source external to the host organization; retrieving first data results from the first data source based on the data request; retrieving second data results from the second data source based on the data request; and returning aggregated data results responsive to the data request based on the first data results and the second data results retrieved. In one embodiment, the internal data source is a multi-tenant database within the host organization. In some embodiments, the external data source is a publicly accessible data source which resides external to the host organization and is controlled by an entity separate and distinct from the host organization, such as a publicly accessible search engine, or a publicly accessible social networking site, etc. In other embodiments, the external data source is a data source at a customer organization of the host organization, where the external data source is external to the host organization, but local to, or internal to the customer organization from which an incoming data request was received.

For example, in an on-demand service environment and/or an on-demand database environment, such as a "cloud computing" environment where a host organization provides computing resources, services, and database services to customer organizations, such customer organizations may retrieve desired data from multiple sources, by submitting only a single transaction to the host organization, where such a host organization provides data aggregation services capable of performing queries and/or searches against not only resources internal to the host organization, but also against resources external to the host organization, pursuant to the fulfillment of a single request which specifies such multiple sources.

Customer organizations utilizing such on-demand services may find it advantageous to submit one transaction to the host organization specifying both a data source internal to the host organization and further specifying a data source external to the host organization, rather than performing multiple searches and/or queries against the various data sources, and then having to somehow aggregate the returned information. The embodiments described herein, enable such a customer organization to submit a query, and then receive aggregated results from the host organization, responsive to a consolidated, individual data request, thus lessening the complexity and development costs for the customer organization.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems where are not directly discussed.

FIG. 1 illustrates an exemplary architecture 100 in which embodiments may operate. Architecture 100 depicts a host organization 110 communicably interfaced with several customer organizations (105A, 105B, and 105C) via network 125. Within the host organization 110 is a web-server 175, file repository 165, results aggregator 170, and a multi-tenant database system 130 having a plurality of underlying hardware, software, and logic elements 120 therein that implement database functionality and a code execution environment within the host organization 110. The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

In one embodiment, the host organization 110 receives a data request 115 at the host organization 110. In such an embodiment, the data request 115 specifies a first data source 116 internal to the host organization and further specifies a second data source 117 external to the host organization. In this embodiment, the host organization 110 retrieves first data results 118A from the first data source 116 based on the data request 115 and retrieves second data results 118B from the second data source 117 based on the data request 115. In this embodiment, the host organization further returns aggregated data results 118 responsive to the data request 115, based on the first data results 118A and the second data results 118B retrieved by the host organization 110.

In one embodiment, results aggregator 170 gathers, collects, or aggregates the retrieved data results, for example, into aggregated data results 118 depicted within the results aggregator 170 of the host organization. These aggregated data results 118 are then returned, as depicted by the copy of aggregated data results 118, being transmitted onto network 125 by host organization 110.

In one embodiment, data requests 115 are received at, or submitted to, a web-server 175 within host organization 110. Host organization 110 may receive a variety of requests for processing by the host organization 110 and its multi-tenant database system 130. Data requests 115 may be received from one or more of the plurality of customer organizations 105A-105C via the network 125. Incoming data requests 115 received at web-server 175 may specify which services from the host organization 110 are to be provided, such as query requests, search request, status requests, data base transactions, a processing request to retrieve, update, or store data on behalf of one of the customer organizations 105A-C, and so forth. Web-server 175 may be responsible for receiving data requests 115 from various customer organizations 105A-C via network 125 and provide a web-based interface to an end-user client machine originating such data requests 115, for example, a client computing device at or operating within a customer organization 105A-C.

In one embodiment, the host organization 110 returning the aggregated data results 118 includes the host organization 110 generating an aggregated results page at the host organization 110 and further transmitting the aggregated results page from the host organization 110 to a remote client device for display. For example, the host organization 110 may transmit the aggregated data results page to a computing device operating within one of the plurality of customer organizations 105A-C via the network 125.

In one embodiment, the aggregated data results 118 is the aggregated data results page. In such an embodiment, the aggregated results page includes: 1) at least a portion of the first data results retrieved (e.g., depicted as first data results 118A or a portion of the first data results 118A); the aggregated results page further includes 2) at least a portion of the second data results retrieved (e.g., depicted as second data results 118B or a portion of the second data results 118B); and the aggregated results page further includes 3) presentation logic 118C to be interpreted by the remote client device (e.g., at one of the customer organizations 105A-C) pursuant to the remote client device displaying the aggregated data results page 118 generated by the host organization 110. For example, the aggregated data results page 118 may be a dynamically generated and rendered web page, such as a web page using perl, php, rails, jsp, asp, or other similar technologies capable of enabling the display of the aggregated data results page 118 having the presentation logic 118C embedded therein.

In one embodiment, receiving the data request 115 at the host organization 110 includes receiving the data request 115 at the web-server 175 operating within the host organization 110. In such an embodiment, transmitting the aggregated data results page 118 from the host organization 110 to the remote client device (e.g., at one of the customer organizations 105A-C) for display includes transmitting the aggregated data results page 118 from the web-server 175 operating within the host organization 110 to the remote client device for display, in which both the data request 115 received, and the aggregated data results page 118 transmitted, are associated with a single user-session. For example, the remote client device at one of the customer organizations 105A-C upon submitting a data request 115 to the host organization may trigger the instantiation of a user session within the host organization 110 (e.g., within web-server 175). Transmitting a response to the computing device, such as transmitting the aggregated data results page 118 to the computing device, is then conducted within the same user session generated or instantiated for the computing device. Additional actions may also occur within the user session for the computing device. For example, a pagination request or a second data request may be received within the user session and thus associated with and understood to be within the context of the previously submitted data request from the computing device, as well as understood contextually to be subsequent to the transmission of the aggregated data results page 118 previously submitted to the computing device within that same user session.

In some embodiments, pagination is implemented by the host organization, so that additional aggregated data results may be returned to a requestor, such as returned to one of the plurality of customer organizations 105A-C responsive to receiving an incoming data request 115. For instance, in some embodiments, a search, query, or other data request 115 will be so specific that all results within the scope of the data request 115 may be returned to the requesting customer organization 105A-C within a single response, such as within a single aggregated data results page 118 returned to the original requestor. In other embodiments, the scope of information resulting from a data request 115 is too large to be returned within a single aggregated data results page 118, and thus, only a portion of the information is returned, such as a portion of the information retrieved from the first data source and a portion of the information retrieved from the second data source.

Where only a portion of all available or applicable information is returned via the aggregated data results 118 which are returned or transmitted to the requesting entity, pagination may be implemented to service subsequent requests for additional information. In some embodiments, a link is provided within a presentation logic 118C of the aggregated data results 118 which enables a computing device to initiate a pagination request (e.g., next data, previous data, skip to offset, etc.).

In one embodiment, the host organization implements pagination of the aggregated data results 118 using one or more of: 1) a pagination method exposed via a first API of the first data source and/or a second API of the second data source; 2) a record offset request method exposed via the first API of the first data source and/or the second API of the second data source; and 3) a stored query locator method exposed via the first API of the first data source and/or the second API of the second data source.

In one embodiment in which pagination is implemented by the host organization 110, the host organization receives a second data request at the host organization 110, and responsively returns additional aggregated data results (e.g., similar to aggregated data results 118, but having different portions of the first data results 118A and different portions of the second data results 118B) responsive to the second data request. Thus, in one embodiment, the additional aggregated data results includes at least a second portion of a first plurality of search results (e.g., from a first data source 116 internal to the host organization) and at least a second portion of a second plurality of search results (e.g., from a second data source 117 external to the host organization). In a different embodiment, the additional aggregated data results includes at least a second portion of a first plurality of database query results (e.g., from a first data source 116 internal to the host organization) and at least a second portion of a second database query results (e.g., from a second data source 117 external to the host organization).

In one embodiment, the host organization 110 having the multi-tenant database system 130 operating therein receives the data request 115 from a customer organization 105A-C. In such an embodiment, the data request 115 received at the host organization 110 is one of a plurality of requests received from a plurality of customer organizations 105A-C, in which each of the plurality of customer organizations 105A-C is an entity selected from the following group: a separate and distinct remote organization, an organizational group within the host organization, a business partner of the host organization, or a customer organization that subscribes to cloud computing services provided by the host organization 110. In some embodiments, some or all of the customer organizations 105A-C are physically separate and distinct entities from the host organization 110, each having their own computing infrastructure which is operated separately from the host organization 110.

Thus, each of the separate and distinct customer organizations 105A-105C may be remotely located from the host organization 110 that provides on-demand services to the customer organizations 105A-105C via a multi-tenant database system 130 executing therein. Alternatively, one or more of the customer organizations 105A-105C may be co-located with the host organization 110, such as within the same organization that hosts and provides the multi-tenant database system 130 upon which underlying data is persistently stored, such as a portion of the data to be retrieved in fulfillment of the data request 115 submitted to the host organization 110 from a customer organization 105A-C. In one embodiment, the underlying data persistently stored upon the multi-tenant database system 130 corresponds to the information or data specified by the first data source 116 which is internal to the host organization. Where the customer organizations 105A-C are remote, host organization 110 provides remotely implemented cloud computing services.

In one embodiment, the hardware, software, and logic elements 120 of the multi-tenant database system 130 include at least a non-relational data store 150 and a relational data store 155, which operate in accordance with the hardware, software, and logic elements 120 that implement the database functionality and code execution environment within the host organization 110.

In accordance with certain embodiments, the multi-tenant database system 130, includes both a relational data store 155 and a non-relational data store 150. In one embodiment, the relational data store 155 includes a relational database implementation selected from the following group: an Oracle compatible database implementation, an IBM DB2 Enterprise Server compatible relational database implementation, a MySQL compatible relational database implementation, and a Microsoft SQL Server compatible relational database implementation. In such an embodiment, the non-relational data store 150 includes a NoSQL non-relational database implementation selected from the following group: a Vampire compatible non-relational database implementation, an Apache Cassandra compatible non-relational database implementation, a BigTable compatible non-relational database implementation, and an HBase compatible non-relational database implementation.

Figure 2:
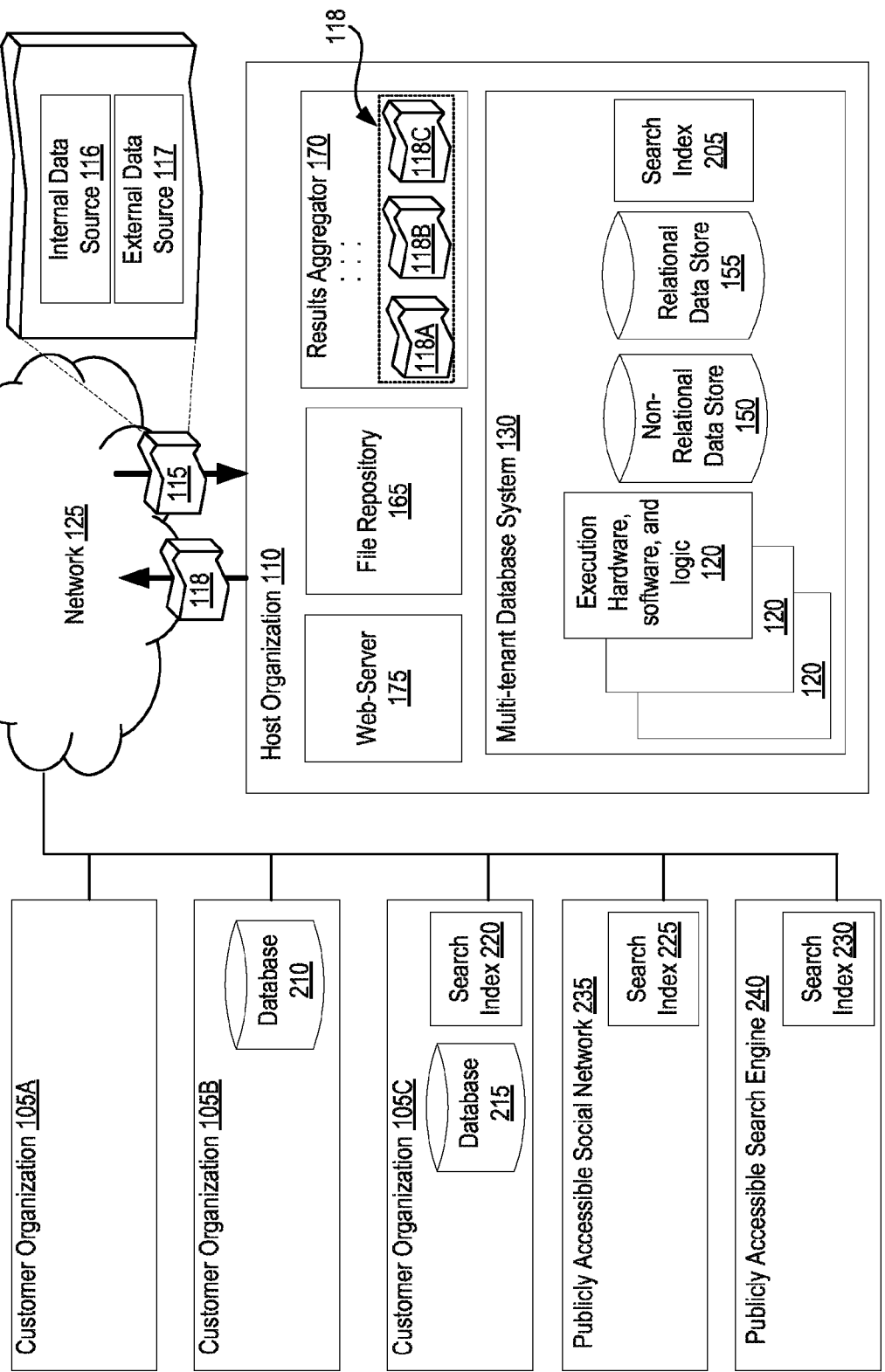
FIG. 2 depicts an alternative exemplary architectural overview of the environment in which embodiments may operate.

FIG. 2 depicts an alternative exemplary architectural overview of the environment 200 in which embodiments may operate. More particularly, various data sources, such as those specified within a data request 115 as an internal data source 116 or an external data source 117 are depicted and described in further detail below.

In one embodiment, the first data source 116 internal to the host organization 110 as specified by the data request 115 includes data stored within the multi-tenant database system 130 of the host organization 110. In such an embodiment, the data request 115 specifies one or both of: a structured query against the multi-tenant database system 130 and/or a text based search against a search index 205 of the multi-tenant database.

Where the data request 115 specifies a structured query against the multi-tenant database system 130, the structured query may include, for example, structured database queries specifying objects in a non-relational data store 150 within the multi-tenant database, structured database queries specifying, for example, one or more tables, columns, and selection criterion from a relational data store 155, or a combination of both.

For example, a structured query to be transacted against a database may include criteria to specify a plurality of rows within one or more tables of a relational data store 155 in the multi-tenant database system 130 or a plurality of objects in a non-relational data store 150 in the multi-tenant database system 130, or both. Similar to specifying the scope of data to be queried against internal to the host organization's multi-tenant database system 130, the data request 115 may specify a structured query to be transacted against a database external to the host organization 110, such as database 210 within customer organization 105B, or database 215 within customer organization 105C. Such externally located databases 210 and 215 are not operated by the host organization 110, but instead, are operated by the respective customer organization hosting each database.

In one embodiment, the second data source 117 external to the host organization 110 includes or corresponds to a publicly accessible search engine 240 which provides search results responsive to text based search queries without requiring authentication. In such an embodiment, retrieving the second data results 118B from the second data source 117 (e.g., the publicly accessible search engine 240) based on the data request 115 includes generating a search request for the second data source 117 (e.g., the publicly accessible search engine 240) based on the data request 115 received and transmitting the search request to the second data source 117 (e.g., transmitting the search request to, for example, the publicly accessible search engine 240 as specified/designated by the external and second data source 117). In such an embodiment, the second data results 118B are received from the second data source 117 (e.g., the external and publicly accessible search engine 240) responsive to the search request transmitted to the second data source 117 (publicly accessible search engine 240). In such an embodiment, there is a correlation, mapping, or association between that which is specified as the external and second data source 117, based on the data request 115, and the underlying data source itself, which in accordance with the above example, is the publicly accessible search engine as designated by element 240.

In another embodiment, the second data source 117 external to the host organization 110 again corresponds to a publicly accessible search engine 240 which provides search results responsive to text based search queries, however, in some embodiments, the publicly accessible search engine 240 requires authentication. Thus, in such an embodiment, retrieving the second data results 118B from the second data source 117 (e.g., from the publicly accessible search engine 240) based on the data request 115 includes retrieving authentication data for the second data source 117 (e.g., the publicly accessible search engine 240) based on the data request 115 received. In such an embodiment, the host organization further generates a search request for the second data source 117 (e.g., the publicly accessible search engine 240) based on the data request 115 received, in which the generated the search request includes at least, the authentication data and additionally, one or more search parameters specified within the data request 115 received by the host organization 110. Such an embodiment further includes transmitting the search request to the second data source 117 (e.g., the publicly accessible search engine 240) and receiving the second data results 118B from the second data source 117 (e.g., from the publicly accessible search engine 240) responsive to the search request transmitted to the second data source.

In some embodiments, the data request 115 specifies one or more strings for use as search parameters via a text based search request against the specified internal and first data source 116 and the external and second data source 117. In such an embodiment, retrieving the first data results 118A from the first data source 116 includes performing a text based search against a search index 205 of the multi-tenant database system 130 using the one or more strings specified for use as search parameters by the data request 115, and retrieving the second data results 118B from the second data source 117 includes performing a separate text based search against a second search index available via the second data source 117 using the same one or more strings specified for use as search parameters by the data request 115. For example, performing the separate text based search against the second search index available via the second data source 117 may include performing the text based search against search index 220 at customer organization 105B, against search index 225 at the publicly accessible social network 235, or against search index 230 at the publicly accessible search engine 240.

In an embodiment where the text based search is performed against search index 220 at customer organization 105B, the customer organization 105B is both the originator of the data request 115 received by the host organization, and the customer organization 105B specifies the external data source 117 as corresponding to search index 220 which is located external to the host organization 110 but located at, with, or local to, the originating customer organization 105B. Stated differently, the customer organization 105B may specify its own local data source (e.g., search index 220) as the external data source 117 within the data request 115. Similarly, a customer organization may specify a database local to the customer organization as the external data source 117 (e.g., customer organization 105B may specify database 210 and customer organization 105C may specify database 215). A customer organization 105A-C need not necessarily specify a data source local to itself however. For example, customer organization 105A does not have a local database or a local search index to operate as the external data source 117 from the host organization, and thus, its data request 115 would specify, for example, publicly accessible search engine 240 and/or publicly accessible social network 235, as the external data source 117.

Thus, in accordance with one embodiment, retrieving the first data results 118A from the first data source 116 includes retrieving a plurality of search results from a search index 205 located internally within the host organization 110; and retrieving the second data results 118B from the second data source 117 includes retrieving a second plurality of search results from a second search index (e.g., one or more of 220, 225, and/or 230) located externally from the host organization 110. In such an embodiment, the aggregated data results 118 returned responsive to the data request 115 therefore includes at least a portion of the first plurality of search results (e.g., retrieved internally) and at least a portion of the second plurality of search results (e.g., retrieved externally).

In embodiments where authentication data is required to access one or more of the data sources, the host organization 110, as part of retrieving data results (e.g., first or second data results 118A or 118B) includes retrieving appropriate authentication data. Thus, in accordance with one embodiment, retrieving the first data results 118A from the first data source 116 based on the data request 115 includes retrieving a first authentication data for accessing the first data source based 116 on the data request 115; and retrieving the second data results 118B from the second data source 117 based on the data request 115 includes retrieving a second authentication data for accessing the second data source 117 based on the data request 115. In such an embodiment, the first authentication data and the second authentication data are separate and distinct from one another. For example, different keys may be used, different user names, different licenses, different passwords, etc., may be utilized to access the distinct internal and external data sources.

In one embodiment, retrieving the first authentication data and/or retrieving the second authentication data based on the data request 115 includes one or more of the following actions: 1) performing a lookup internal to the host organization based on the data request 115 received and based further on an originating source of the data request 115 (e.g., based on information within the data request 115 and based also on the identity of the originating entity, such as one of customer organizations 105A-C); one of the actions may further include 2) extracting the first authentication data and/or the second authentication data from the data request 115 received (e.g., the authentication data may be passed and encoded within the data request itself; and one of the actions may further include 3) retrieving default authentication parameters for use as the second authentication data based on the second data source 117 specified by the data request (e.g., the host organization 110 may utilize known default authentication parameters based on the particular external data source 117 specified, or the host organization may utilize its own license on behalf of the requestor, and corresponding authentication data associated with such a license, or the host organization 110 may need only to identify itself to the external data source 117 so as to satisfy the authentication requirements of the external data source 117).

Where the host organization performs a look up or retrieves authentication data based on the incoming data request 115, such authentication data may be stored in, looked up, and retrieved from, for example, the file repository 165 within the host organization, or from within the multi-tenant database system 130 (e.g., by performing a query against the multi-tenant database system 130).

Figure 3:
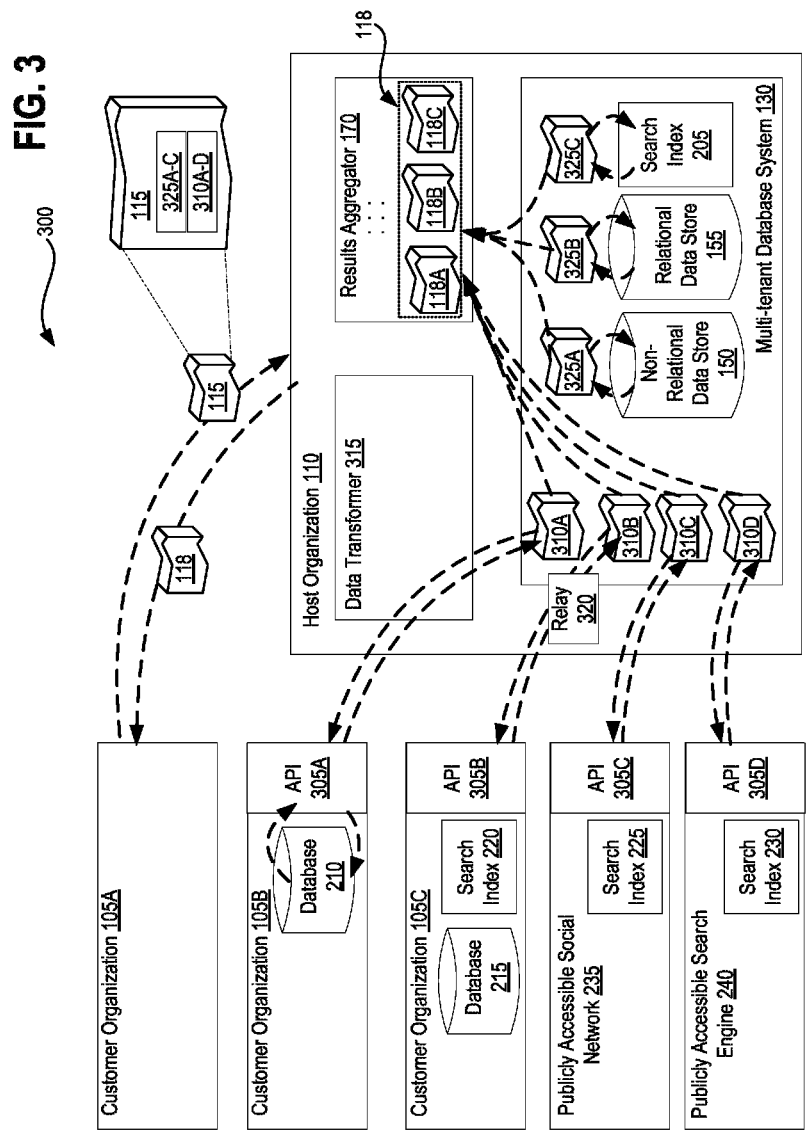
FIG. 3 depicts an alternative exemplary architectural overview of the environment in which embodiments may operate.

FIG. 3 depicts an alternative exemplary architectural overview of the environment 300 in which embodiments may operate. In some embodiments, the host organization 110 makes use of virtual objects and queryable virtual objects. In such an embodiment, the host organization 110 enables a virtual object to be declared and to be associated with an underlying data source, such that the virtual object is queryable (e.g., capable of being the target of a query, search, or other transaction) by resolving or directing the query, search, or transaction request to its underlying data source.

Declaration and use of virtual objects within the host organization 110 enables better re-use of called-out information and additionally reduces the overall cost of implementing large-scale customer organization projects where data is stored outside of the customer organization's application. Virtual objects/queryable objects within the host organization 110 may be utilized throughout a customer organization's application operating within a host organization (e.g., within an on-demand services environment, on-demand database environment, or cloud computing environment) just as though they are standard objects.

Declaration and use of such objects simplifies federated search across external and remote data sources (external from the host organization), thus providing better usability for subscribers of services provided by the host organization. Access to social media sites (e.g., publicly accessible social network 235) may be provided to service subscribes and customer organizations without requiring such customer organizations to develop or implement customized code for separately accessing such data sources. Queries to extra large data volumes (XLDV) is further enabled permitting display at a standardized query and search interface (e.g., via web-server as discussed above), regardless of whether or not such XLDV volumes are internal or remote to the host organization.

In accordance with one embodiment, a data request 115 received by the host organization 110 specifies a database query and further specifies two or more queryable objects (e.g., at least one of 310A, 310B, 310C, and 310D, and at least one of 325A, 325B, and 325C). In such an embodiment, a first one of the two or more queryable objects/virtual objects (e.g., one of 325A, 325B, and 325C) resolves to a queryable table within the multi-tenant database system 130 of the host organization 110; and a second one of the two or more queryable objects (e.g., one of 310A, 310B, 310C, and 310D) resolves to a queryable table accessible via the second data source.

As depicted by FIG. 3, the incoming data request 115 specifies a data source which is internal to the host organization by specifying one of 325A-C within the request, each of 325A-C corresponding to a virtual object which maps to, resolves to, corresponds to, or is associated with a data source internal to the host organization, such as the non-relational data store 150, the relational data store 155, or the search index 205, each within the multi-tenant database system 130 of the host organization.

The incoming data request 115 further specifies a data source which is external to the host organization by specifying one of 310A-D within the data request 115, each of 310A-D corresponding to a virtual object which maps to, resolves to, corresponds to, or is associated with a data source which is external to the host organization 110. For example, virtual object 310A resolves to database 210 within customer organization 105B, or to, for example, a table or other addressable element within database 210. Virtual object 310B resolves to one or both of search index 220 and/or data base 215, each located within customer organization 105C, external to the host organization 110. Virtual object 310C resolves to search index 225 within publicly accessible social network 235. Virtual object 310D resolves to search index 230 within publicly accessible search engine 240, external to the host organization.

In one embodiment, the data request which specifies the first data source internal to the host organization includes the data request specifying a first queryable object (e.g., one of internally facing virtual objects 325A-C) which resolves to a queryable table within the multi-tenant database system 130 internal to the host organization 110 and in which specifying the second data source external to the host organization includes the data request 115 specifying a second queryable object (e.g., one of externally facing virtual objects 310A-D) which resolves to a queryable table accessible via the second data source, external to the host organization 110.

In such an embodiment, externally facing queryable objects (e.g., each of 310A-D) each defines at least: 1) an Application Programming Interface (API) end-point (e.g., 305A, 305B, 305C, or 305D) via which an underlying data source associated with the respective queryable object may be communicated with. Moreover, internally facing queryable objects (e.g., each of 325A-C) may each also define an API end-point via which data sources internal to the host organization 110 may be accessed.

In such an embodiment, each queryable object (e.g., any of 310A-D or 325A-C) further defines: 2) an API type identifying one of a plurality of enumerated transaction formats selected from the API types comprising: an RSS (Really Simple Syndication) feed; a publicly accessible non-authenticated data source; a publicly accessible per-user-authenticated data source; a publicly accessible license based authenticated data source; a publicly accessible search engine; a private data source located at a customer organization remote from the host organization; and an internal multi-tenant database transaction within the host organization. In such an embodiment, each queryable object (e.g., any of 310A-D or 325A-C) further defines: 3) an authentication type for accessing the underlying data source associated with the respective queryable object. The queryable objects (e.g., any of 310A-D or 325A-C) may further define: 4) one or more queryable fields within the underlying data source associated with the respective queryable object.

In some embodiments, API end-points (e.g., any of 305A-D) are provided by an external data source, and may be utilized by the host organization 110 for retrieving information, performing queries, or conducting searches, such as text based or string based searches of search indexes. For example, in one embodiment, publicly accessible social network 235 provides API end-point 305C which enables access to search index 225, and publicly accessible search engine 240 provides API end-point 305D which provides access to search index 230. In some embodiments, one or more customer organizations may also provide an API end-point (e.g., 305A or 305B) which may be utilized by the host organization 110 to access data within the respective customer organization (e.g., 105B or 105C as depicted). In other embodiments, it may be desirable for the host organization 110 to access data located externally within a customer organization 105A-C, but the respective customer organization 105A-C provides no mechanism by which to access such data.

Therefore, in accordance with one embodiment the host organization 110 deploys an API to a customer organization 105A-C for installation. For instance, so as to enable the future retrieval of information from an external data source located at such a customer organization 105A-C (e.g., a data source external to the host organization), the host organization deploys an API to the customer organization for installation, where the API exposes access methods for the second data source, located at the respective customer organization, to the host organization, via the API. In such an embodiment, retrieving second data results from the second data source (external to the host organization 110) based on the data request 115 includes retrieving the second data results from the second data source at the one customer organization (e.g., one of 105A-C) via the exposed access methods of the API. In such an embodiment, the deployed and installed API may therefore be designated as an API end-point within an externally facing virtual object (e.g., within one of 310A-D).

In one embodiment, the virtual object is a new type of custom object within the host organization, but may be stored in the same custom schema tables as custom objects and knowledge articles. A virtual object may have any of several features associated with it, including, for example, a virtual object may be marked as with a "_x" or similar suffix to denote that it is a virtual object; a virtual object may support all standard operations that apply to a standard object (including pre triggers and validation formulas; a virtual object may utilize key prefixes to uniquely identify each of several available virtual objects; a virtual object does not necessarily require an association with a particular client, customer, subscriber, or customer organization identity; and a custom ID field may be provided and used to reference the virtual object when an external table includes a correspondingly mapped "external id" column, so as to provide association between the external table and the virtual object.

In some embodiments, an expressly defined mapping is provided between: 1) addressable elements within a multi-tenant database system 130 of the host organization (e.g., a table, an object, a column, a field, etc.) and 2) an external but addressable element, located external from the host organization, and thus, lacking a context within the multi-tenant database system 130. For example, a restricted set of custom virtual fields may be added to a custom object established as a virtual object/queryable object. In some embodiments, a standard "External Id" field may be implemented by an externally located data source, so as to provide a mapping to the virtual object within the host organization. Alternatively, the custom virtual fields may be utilized to provide an appropriate mapping. In some embodiments, table located internal to the host organization within the multi-tenant database includes an external foreign key which maps and resolves to a table which is located external to the host organization. This may be done by pointing to a virtual object within the host organization which is externally facing, and thus, resolves to a data source which is external to the host organization.

Supported virtual field types for the purpose of mapping between internal fields and external fields may include, for example, text, Boolean, Currency, Date, Datetime, Email, Number, Percent, Phone, and so forth.

In one embodiment, the second data source at a customer organization (e.g., one of 105A-C) includes a queryable database (e.g., database 210 or database 215) which is operated and controlled by the corresponding customer organization. In such an embodiment, a data request 115 from a customer organization 105A-C specifies a database query having a query scope that encompasses at least a portion of the queryable database (e.g., database 210 or database 215) operated and controlled by the respective customer organization 105A-C. In such an embodiment, the query scope further encompasses at least a portion of data stored within the multi-tenant database system 130 located internally to the host organization 110 and operated and controlled by the host organization 110.

In an alternative embodiment, a table internal to the host organization 110 contains an external foreign key which maps to or resolves to a table or data within a table which is external to the host organization. Therefore, in accordance with one embodiment, a second and external data source at a customer organization 105A-C includes a queryable database (e.g., database 210 or database 215) operated and controlled by the customer organization 105A-C, and the data request 115 specifies a database query to a table within a multi-tenant database system 130 internal to the host organization, in which the table includes an external foreign key which resolves to the queryable database operated and controlled by the customer organization 105A-C. In such an embodiment, specifying the second data source external to the host organization via the data request 115 includes specifying a database query to a table within the multi-tenant database having the external foreign key and thus requiring retrieval of the second data results from the queryable database operated and controlled by the respective customer organization external to the host organization so as to resolve the external foreign key.

In one embodiment, retrieving the first data results from the first data source internal to the host organization includes retrieving a first results set from the first data source in a first format. In such an embodiment, retrieving the second data results from a second data source external to the host organization includes retrieving a second results set from the second data source in a second format different from the first format. In such an embodiment, the host organization transforms the second results set in the second format into the second results set formatted in accordance with the first format, including at least a pointer to a first of a plurality of rows within the second results set. By transforming the data in such a way, both internally retrieved data and externally retrieved data may be presented, aggregated, referenced, and utilized in a consistent format. In one embodiment, results retrieved externally, such as from the second data source, may be passed through a data transformer 315 module so as to perform the necessary data manipulations.

In some embodiments, when a queryable object is referenced, such as an externally facing virtual object 310A-D, the mechanism which queries the object is agnostic or ignorant to the fact that the virtual object being called resolves to an external data source. In such an embodiment, a relay 320 module is utilized which performs the resolution of the externally facing virtual object 310A-D to the targeted external underlying data source. For example, the relay 320 may extract the API endpoint declared or defined by such an externally facing virtual object 310A-D, and act as an intermediary to communicate with the external data source (such as data sources within an externally located customer organization 105A-C or one of publicly accessible social network 235 or publicly accessible search engine 240.

Regardless of whether virtual objects are utilized, once first data results from the internal data source and the second data results from the external data source have been retrieved, the results may be collected, gathered, and/or aggregated by a results aggregator 170, and returned by the host organization 110 as aggregated data results 118.

Regarding the APIs and API end-points (e.g., APIs 305A-D), the host organization 110 supports a series of standardized backends in support of the various virtual object types, so as to minimize or completely negate any requirement for customer organizations 105A-C and other service subscribers of the host organization to perform customized development when initiating data requests 115 which specify an external data source from the host organization. In such embodiments, virtual objects (e.g., 310A-D) therefore specify an external endpoint corresponding to an available or a deployed API end-point (305A-D). A default API end-point 305A-D may be defined within a virtual object. APIs 305A-D may support SOAP (Simple Object Access Protocol). When a query, search, or other transaction is initiated against a virtual object that is externally facing (e.g., one of 310A-D), relay 320, or another callout mechanism may be instantiated to service the transaction with the external data source ultimately underlying the externally facing virtual object (310A-D), rather than attempting to transact with the multi-tenant database system 130 internal to the host organization.

Polymorphic search is permissible against the virtual objects, thus allowing a search page (e.g., at web server 175) to initiate access to multiple objects in one call or responsive to a single data request 115 received by the host organization.

In one embodiment, a Java compatible implementation may be used to support the functionality of a standardized and deployed API end-point 305A-D, such that JDBC is well supported, and yields JDBC compliant results sets. A Java compatible API may provide an extension that translates Salesforce Object Search Language (SOSL) results into a standardized search format (e.g., Lucene Apache compliant search query, etc.), for example, operating as a data transformer 315.

The APIs end-point 305A-D support appropriate handling of authorization information/authentication data (e.g., Oauth/SID/etc) on behalf of an external data source, and support retrieval of an oauth nonce from the external data source for the rest of the request where supported. The APIs end-points 305A-D support a return of set of records up to a certain limit/threshold (e.g., 200 or other sensible limit) responsive to a query.

In accordance with one embodiment, a non-transitory computer readable storage medium having instructions stored thereon that, when executed by a system in the host organization 110 having a processor and memory therein, the instructions cause the system and/or the host organization 110 to perform operations, perform a method, or carry out instructions, for receiving a data request 115 at the host organization 110, in which the data request specifies a first data source internal to the host organization and further specifies a second data source external to the host organization; retrieving first data results from the first data source based on the data request; retrieving second data results from the second data source based on the data request; and returning aggregated data results 118 responsive to the data request 115 based on the first data results and the second data results retrieved.

Figure 4:
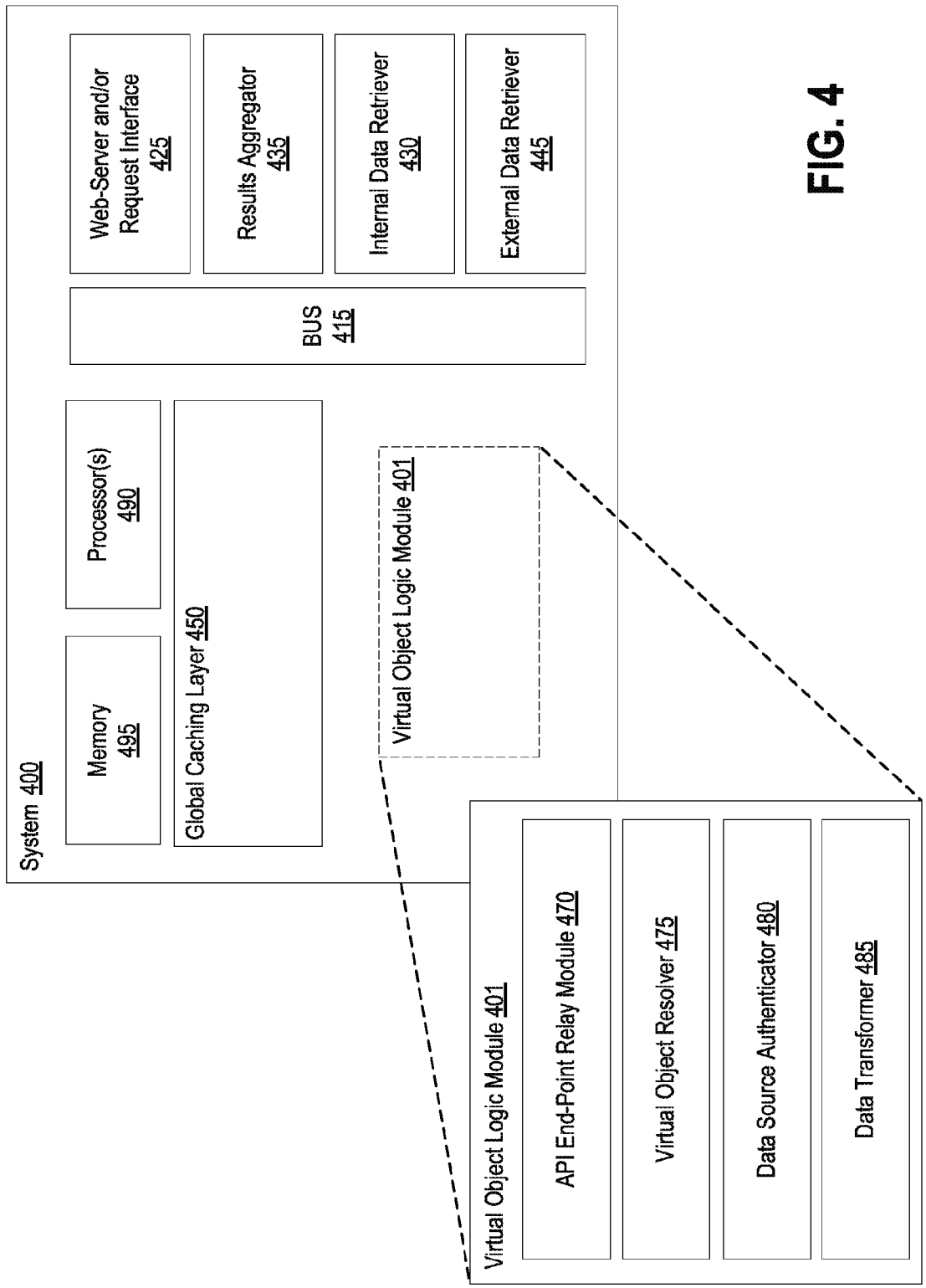
FIG. 4 shows a diagrammatic representation of a system in which embodiments may operate, be installed, integrated, or configured.

FIG. 4 shows a diagrammatic representation of a system 400 in which embodiments may operate, be installed, integrated, or configured.

In one embodiment, system 400 includes a memory 495 and a processor or processors 490. For example, memory 495 may store instructions to be executed and processor(s) 490 may execute such instructions. System 400 includes bus 415 to transfer transactions and data within system 400 among a plurality of peripheral devices communicably interfaced with bus 415. System 400 further includes web-server and/or request interface 425, for example, to receive data requests, return responses, and otherwise interface with remote clients, such as client devices located within customer organizations 105A-C. Web-server and/or request interface 425 may operate as a request interface to receive data requests or other transaction and service requests on behalf of a multi-tenant database communicably interfaced with the system 400.

System 400 is further depicted as having a results aggregator 435 designed to collect, gather, and aggregate information collected pursuant to a received data request, such as first data results from a data source operating internal to a host organization in which the system 400 operates and second data results from a data source which operates external to the host organization in which the system 400 operates. Internal data retriever 430 serves to retrieve data results from sources internal to a host organization in which the system 400 operates. External data retriever 445 serves to retrieve data results from sources external to a host organization in which the system 400 operates. Global caching layer 450 provides caching services to communicably interfaced devices and systems and in particular, provides caching of status information and results data (e.g., results from internal sources, results from external sources, etc.) associated with the fulfillment of data requests received from customer organizations. Global caching layer 450 may additionally provide storage as necessary for the system 400, for example, to store authentication data or information regarding internal and external data sources as specified by a received data request or queryable virtual objects as specified by such a data request.

Distinct within system 400 is virtual object logic module 401 which includes API end-point relay module 470, virtual object resolver 475, data source authenticator 480, and data transformer 485. Any or all of the components of virtual object logic module 401 may be hardware based, such that each is enabled by the hardware of system 400 in conjunction with the system 400's processor(s) 490 and memory 495 to carry out the described capabilities. In accordance with one embodiment, API end-point relay module 470 provides a mechanism by which requests directed to sources external to a host organization in which the system 400 operates may be received and relayed/communicated to the targeted external data source. Virtual object resolver 475 provides a mechanism by which a virtual object or a queryable object specified as a data source, external or internal, may be resolved, mapped, or translated to its underlying data source. Data source authenticator 480 provides a mechanism to retrieve necessary and appropriate authentication data and encode such authentication data into a request which is directed toward or relayed to an external data source or an internal data source which requires the authentication data. Data transformer 485 provides a mechanism to transform non-JDBC compliant results sets or result data into a JDBC compliant results set, including at least a cursor or appropriate pointer to a first or current row.

In one embodiment, a system 400 is to operate within a host organization, in which the system 400 includes a processor 490 and memory 495 to execute instructions; a request interface 425 to receive a data request at the host organization, where the data request specifies a first data source internal to the host organization and further specifies a second data source external to the host organization; an internal data retriever 430 to retrieve first data results from the first data source based on the data request; an external data retriever 445 to retrieve second data results from the second data source based on the data request; and a results aggregator 435 to return aggregated data results responsive to the data request based on the first data results and the second data results retrieved.

In one embodiment, such a system 400 further includes a web server 425, in which the web server implements the request interface to receive the data request at the host organization, and further in which the web server also transmits an aggregated results page from the host organization to a remote client device for display at the remote client device.

FIG. 5 is a flow diagram illustrating a method 500 for implementing virtual objects in an on-demand database environment in accordance with disclosed embodiments, including receiving data requests, and coordinating the retrieval and aggregation of results from both internal and external data sources as specified by an incoming data request, and the return of aggregated data results to a requestor responsive to a received data request. In some embodiments, first data results are retrieved from a multi-tenant database system internal to a host organization and second data results are retrieved from a data source which is external and physically separate and distinct from such a host organization in which the multi-tenant database system operates. Method 500 may be performed by processing logic that may include hardware (e.g., circuitry, dedicated logic, programmable logic, microcode, etc.), software (e.g., instructions run on a processing device to perform various query, search, receiving, transmitting, and aggregating operations with internal and external data sources. In one embodiment, method 500 is performed by a hardware based system, such as system 400 set forth at FIG. 4. Some operations may be performed by virtual object logic module 401 as set forth within system 400 of FIG. 4. Some of the blocks and/or operations listed below are optional in accordance with certain embodiments. The numbering of the blocks presented is for the sake of clarity and is not intended to prescribe an order of operations in which the various blocks must occur.

Method 500 begins with processing logic for deploying one or more Application Programming Interfaces (APIs) for installation by customer organizations (block 505). For example, while some external data sources provide an API via which to access data at such an external data sources, other data sources have no such API. Thus, host organization may optionally deploy an API to such a data source, for example, to a customer organization for installation so as to make the external data source of the customer organization available to an external data retriever of the host organization.

At block 510, processing logic receives a data request at the host organization. Such a data request may specify both an internal data source and an external data source, or specify multiple queryable objects, in which at least one queryable object is a virtual object which resolves to an internal data source and in which at least one queryable object is a virtual object which resolves to an external data source.

At block 515, processing logic retrieves first data results from an internal first data source based on the data request.

The method further retrieves second data results from an external second data source based on the request. For example, at block 520, processing logic retrieves authentication data for the second data source based on the data request received, at block 525, processing logic generates a search request for the second data source based on the data request received, including the retrieved authentication data where and when such authentication data is required, at block 530, processing logic transmits the search request to the second data source or communicates such a search request to a deployed API end-point of the second data source, and at block 535, processing logic receives the second data results from the second data source responsive to the search request transmitted to the second data source, thus having retrieved the second data results from the second external data source.

At block 540, processing logic transforms a non-JDBC standards compliant results set received as the second data results into a JDBC standards compliant results set.

At block 545, processing logic generates aggregated data results or generates an aggregated results page at the host organization and at block 550, processing logic returns the aggregated data results or the aggregated data results page responsive to the data request based on the first data results and the second data results retrieved (e.g., by sending or transmitting to a customer organization that originated a corresponding data request).

At block 555, processing logic implements pagination of the aggregated data results. At block 560, processing logic receives a second data request at the host organization, and at block 565, processing logic returns additional aggregated data results responsive to the second data request using the pagination implementation.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment or an on-demand database environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and a persistent database and/or a multi-tenant database implementation), which communicate with each other via a bus 630. Main memory 604 includes a results aggregator 624 which operates in conjunction with the data retriever 623. Data retriever 623 retrieves first results from an internal data source and further retrieves second data results from an external data source, and provides both the first data results and the second data results to the results aggregator 624 which generates aggregated data results and/or an aggregated data results page. Main memory 604 and its sub-elements (e.g. 623 and 624) are further operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.). The computer system 600 may further include a virtual object logic module 634 capable of operating on and with queryable objects and virtual objects which resolve to internal data sources or external data sources relative to a host organization (e.g., providing relay capabilities, resolution of virtual objects to underlying data sources, authenticating with data sources, and transforming data results sets, as necessary), in accordance with the described embodiments.

The secondary memory 618 may include a non-transitory machine-readable or computer readable storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
receiving a single data request at a host organization from a remote client device communicatively interfaced with the host organization over a network, wherein the single data request specifies both a first data source internal to the host organization and further specifies a second data source external to the host organization;
retrieving first data results at the host organization from the first data source on behalf of the remote client device based on the single data request;
retrieving second data results at the host organization from the second data source on behalf of the remote client device based on the single data request;
generating an aggregated results page at the host organization having both the first data results and the second data results represented therein for display at the remote client device; and
returning the aggregated results page generated at the host organization to the remote client device responsive to the single data request received from the remote client device.

2. The method of claim 1, wherein returning the aggregated data results comprises:
generating the aggregated results page at the host organization based at least in part on the second results set retrieved from the second data source external to the host organization by executing a query against a search index of a publicly accessible social network external to the host organization.

3. The method of claim 1, wherein the aggregated results page comprises:
at least a portion of the first data results retrieved;
at least a portion of the second data results retrieved; and
presentation logic to be interpreted by the remote client device pursuant to the remote client device displaying the aggregated results page generated by the host organization.

4. The method of claim 1:
wherein receiving the single data request at the host organization comprises receiving the single data request at a web-server operating within the host organization; and
wherein transmitting the aggregated results page from the host organization to the remote client device for display comprises transmitting the aggregated results page from the web-server operating within the host organization to the remote client device for display, wherein both the single data request received and the aggregated results page transmitted are associated with a single user-session.

5. The method of claim 1:
wherein the first data source internal to the host organization comprises data stored within a multi-tenant database of the host organization; and
wherein the single data request specifies one or both of: a structured query against the multi-tenant database and/or a text based search against a search index of the multi-tenant database.

6. The method of claim 5:
wherein the second data source external to the host organization comprises a publicly accessible search engine which provides search results responsive to text based search queries without requiring authentication;
wherein retrieving the second data results from the second data source based on the single data request comprises:
generating a search request for the second data source based on the single data request received;
transmitting the search request to the second data source; and
receiving the second data results from the second data source responsive to the search request transmitted to the second data source.

7. The method of claim 5:
wherein the second data source external to the host organization comprises a publicly accessible search engine which provides search results responsive to text based search queries;
wherein retrieving the second data results from the second data source based on the single data request comprises:
retrieving authentication data for the second data source based on the single data request received;
generating a search request for the second data source based on the single data request received, wherein the search request comprises at least, the authentication data and one or more search parameters specified within the single data request received by the host organization;
transmitting the search request to the second data source; and
receiving the second data results from the second data source responsive to the search request transmitted to the second data source.

8. The method of claim 5:
wherein the single data request specifies one or more strings for use as search parameters via a text based search request;
wherein retrieving the first data results from the first data source comprises performing the text based search against the search index of the multi-tenant database using the one or more strings specified for use as search parameters; and
wherein retrieving the second data results from the second data source comprises performing a separate text based search against a second search index available via the second data source using the same one or more strings specified for use as search parameters.

9. The method of claim 5:
wherein the single data request specifies a database query and further wherein the single data request specifies two or more queryable objects;
wherein a first of the two or more queryable objects resolves to a queryable table within the multi-tenant database of the host organization; and
wherein a second of the two or more queryable objects resolves to a queryable table accessible via the second data source.

10. The method of claim 1:
wherein the single data request which specifies the first data source internal to the host organization and further specifies the second data source external to the host organization comprises the single data request specifying a first queryable object which resolves to a queryable table within a multi-tenant database internal to the host organization and a second queryable object which resolves to a queryable table accessible via the second data source, external to the host organization; and
wherein each queryable object defines at least:
1) an Application Programming Interface (API) end-point via which an underlying data source associated with the respective queryable object may be communicated with;
2) an API type identifying one of a plurality of enumerated transaction formats selected from the API types comprising: an RSS (Really Simple Syndication) feed; a publicly accessible non-authenticated data source; a publicly accessible per-user-authenticated data source; a publicly accessible license based authenticated data source; a publicly accessible search engine; a private data source located at a customer organization remote from the host organization; and an internal multi-tenant database transaction within the host organization;
3) an authentication type for accessing the underlying data source associated with the respective queryable object; and
4) one or more queryable fields within the underlying data source associated with the respective queryable object.

11. The method of claim 1:
wherein retrieving first data results from the first data source based on the single data request comprises retrieving a first authentication data for accessing the first data source based on the single data request; and
wherein retrieving second data results from the second data source based on the single data request comprises retrieving a second authentication data for accessing the second data source based on the single data request, wherein the first authentication data and the second authentication data are separate and distinct from one another.

12. The method of claim 11:
wherein retrieving the first authentication data and/or retrieving the second authentication data based on the single data request comprises one or more of:
performing a lookup internal to the host organization based on the single data request received and based further on an originating source of the single data request;
extracting the first authentication data and/or the second authentication data from the single data request received; and
retrieving default authentication parameters for use as the second authentication data based on the second data source specified by the single data request.

13. The method of claim 1:
wherein receiving the single data request at the host organization comprises receiving the single data request from one of a plurality of customer organizations;
wherein the method further comprises deploying an Application Programming Interface (API) to the one customer organization for installation, wherein the API exposes access methods for the second data source, located at the one customer organization, to the host organization, via the API; and
wherein retrieving the second data results from the second data source based on the single data request comprises retrieving the second data results from the second data source at the one customer organization via the exposed access methods of the API.

14. The method of claim 13:
wherein the second data source at the one customer organization comprises a queryable database operated and controlled by the one customer organization; and
wherein the single data request from the customer organization specifies a database query having a query scope that encompasses at least a portion of the queryable database operated and controlled by the one customer organization and that further encompasses at least a portion of data stored within a multi-tenant database located internally to the host organization and operated and controlled by the host organization.

15. The method of claim 13:
wherein the second data source at the one customer organization comprises a queryable database operated and controlled by the one customer organization; and
wherein the single data request which specifies the first data source internal to the host organization comprises the single data request specifying a database query to a table within a multi-tenant database internal to the host organization, wherein the table comprises an external foreign key which resolves to the queryable database operated and controlled by the one customer organization; and
wherein the single data request which further specifies the second data source external to the host organization comprises the single data request specifying, within the database query to the table within the multi-tenant database, the external foreign key requiring retrieval of the second data results from the queryable database operated and controlled by the one customer organization.

16. The method of claim 1:
wherein retrieving the first data results from the first data source comprises retrieving a first results set from the first data source in a first format;
wherein retrieving the second data results from the second data source comprises retrieving a second results set from the second data source in a second format different from the first format; and
wherein the method further comprises transforming the second results set in the second format into the second results set formatted in accordance with the first format, including at least a pointer to a first of a plurality of rows within the second results set.

17. The method of claim 1:
wherein retrieving the first data results from the first data source comprises retrieving a plurality of search results from a search index located internally within the host organization;
wherein retrieving the second data results from the second data source comprises retrieving a second plurality of search results from a second search index located externally from the host organization; and
wherein aggregated data results returned responsive to the single data request comprises at least a portion of the first plurality of search results and at least a portion of the second plurality of search results.

18. The method of claim 17, further comprising:
implementing pagination of the aggregated data results using one or more of: 1) a pagination method exposed via a first API of the first data source and/or a second API of the second data source; 2) a record offset request method exposed via the first API of the first data source and/or the second API of the second data source; and 3)

a stored query locator method exposed via the first API of the first data source and/or the second API of the second data source;

receiving a second single data request at the host organization; and returning additional aggregated data results responsive to the second single data request, wherein the additional aggregated data results comprises at least a second portion of the first plurality of search results and at least a second portion of the second plurality of search results.

19. The method of claim 1:

wherein the first data source internal to the host organization comprises a multi-tenant database having elements of hardware and software that are shared by a plurality of separate and distinct customer organizations, each of the separate and distinct customer organizations being remotely located from the host organization having the multi-tenant database operating therein; and wherein the single data request is received at the host organization from one of the plurality of customer organizations.

20. A non-transitory computer readable storage medium having instructions stored thereon that, when executed by a system in a host organization having a processor and memory therein, the instructions cause the system to perform operations comprising:

receiving a single data request at a host organization from a remote client device communicatively interfaced with the host organization over a network, wherein the single data request specifies both a first data source internal to the host organization and further specifies a second data source external to the host organization;

retrieving first data results at the host organization from the first data source on behalf of the remote client device based on the single data request;

retrieving second data results at the host organization from the second data source on behalf of the remote client device based on the single data request;

generating an aggregated results page at the host organization having both the first data results and the second data results represented therein for display at the remote client device; and returning the aggregated data results page generated at the host organization to the remote client device responsive to the single data request received from the remote client device.

21. A system in a host organization, the system comprising:

a processor and memory to execute instructions;

a request interface to receive a single data request at the host organization from a remote client device communicatively interfaced with the host organization over a network, wherein the single data request specifies both a first data source internal to the host organization and further specifies a second data source external to the host organization;

an internal data retriever to retrieve first data results at the host organization from the first data source on behalf of the remote client device based on the single data request;

an external data retriever to retrieve second data results at the host organization from the second data source on behalf of the remote client device based on the single data request;

a results aggregator to generate an aggregated results page at the host organization having both the first data results and the second data results represented therein for display at the remote client device; and the results aggregator to return the aggregated results page generated at the host organization to the remote client device responsive to the single data request received from the remote client device.

22. The system of claim 21, wherein the system further comprises a web server, wherein the web server implements the request interface to receive the single data request at the host organization, and wherein the web server further transmits the aggregated results page from the host organization to the remote client device for display at the remote client device, the aggregated results page having all or a portion of the aggregated data results therein and further having presentation logic embedded therein.

* * * * *